United States Patent [19]

Gran et al.

[11] Patent Number: 4,638,453

[45] Date of Patent: Jan. 20, 1987

[54] SIGNAL PROCESSING UNIT

[75] Inventors: Paul Gran, Kfar Saba; Haim Feiner, Herzilia; Nissim Ben-Dayan, Tel-Aviv, all of Israel; Marian Stefaniu, Don Mills, Canada; Yechiam Mar-Chaim, Tel Aviv, Israel

[73] Assignee: Motorola, Inc., Schaumburg, Ill.

[21] Appl. No.: 479,537

[22] Filed: Mar. 28, 1983

[51] Int. Cl.$^4$ .............................................. G06F 13/38
[52] U.S. Cl. .................................................... 364/900
[58] Field of Search ... 364/200 MS File, 900 MS File

[56] References Cited

U.S. PATENT DOCUMENTS

| | | | |
|---|---|---|---|
| 4,096,566 | 6/1978 | Borie et al. | 364/200 |
| 4,356,547 | 10/1982 | Barcaroli et al. | 364/200 |
| 4,366,535 | 12/1982 | Cedolin et al. | 364/200 |

Primary Examiner—Thomas M. Heckler

Attorney, Agent, or Firm—Thomas G. Berry; Donald B. Southard

[57] ABSTRACT

This invention relates to a signal processing unit typically in the form of a status and control unit forming part of a supervisory control system.

The unit monitors status inputs and transmits messages to a central station indicating the status of these inputs and also has control outputs which may be activated on a command from a central station to provide a control function. In response to a predetermined stimulus such as a change of state at a status input the unit generates a new message for a neighboring status and control unit by incrementing or decrementing its own address to obtain a new address for transmission. In this way messages may be transmitted between units as well as between the central station and the units thereby allowing communication to units which lie outside the range of the central station itself.

The invention has particular application in supervisory control systems.

11 Claims, 5 Drawing Figures

SIGNAL PROCESSING UNIT

FIELD OF THE INVENTION

This invention relates to a signal processing unit and particularly but not exclusively to a unit suitable for forming part of a supervisory control system in which a plurality of such units perform monitoring and control functions under the supervision of a central station which communicates with the units via a communication link which may be a radio or wire line line.

DESCRIPTION OF RELATED ART

A known signal processing unit of the above type may be a status unit, a control unit, or a status-and-control unit—a status unit monitors the state on one or more input signals and when a change of state occurs at an input a message to this effect is sent to the central station the message containing an address which identifies the status unit concerned.

A control unit provides one or more control outputs at which signals are provided for remote control functions. Activation of a control output usually results in the closure of a relay contact and this may be done by means of a message sent from the central station to the control units.

A status-and-control unit includes both status inputs and control outputs.

A problem with such known signal processing units is that of communication from the central station to a remote unit located beyond the range of the transmission from the central unit. Conventionally, repeaters would have to be used which merely amplify a transmission, adding noise.

This invention seeks to provide a signal processing unit having improved communication capability.

SUMMARY OF THE INVENTION

According to the present invention there is provided a signal processing unit comprising processing means; transceiving means for transmitting messages provided by the processing means and for receiving messages transmitted to the signal processing unit; address means for programming the processing unit with a unique address, the processing means being responsive to a predetermined stimulus to generate a message for transmission which includes as a destination address the unit address modified in a predetermined manner.

The processing means may be a suitably programmed microprocessor.

The address means may comprise digital storage means coupled to the processing means via a data bus.

The signal processing unit may include one or more status monitoring inputs the predetermined stimulus comprising a change of state detected at one or more of the status inputs.

The signal processing unit may include one or more control outputs each operable under the control of the processing means to provide a control signal output and the said change of state at one or more of the status inputs may be derived by coupling the said one or more status inputs to respective ones of the control outputs.

In an embodiment of the invention the coupling between status inputs and control output may be hard wired coupling.

In another embodiment the said coupling may be provided by the processing means under programme control.

The processing means may be operative to increment or decrement the unit address by a predetermined amount to provide the said message for transmission.

BRIEF DESCRIPTION OF THE DRAWINGS

An exemplary embodiment of the invention will now be described with reference to the drawings in which.

DESCRIPTION OF THE PREFERRED EMBODIMENT

Figure 1:
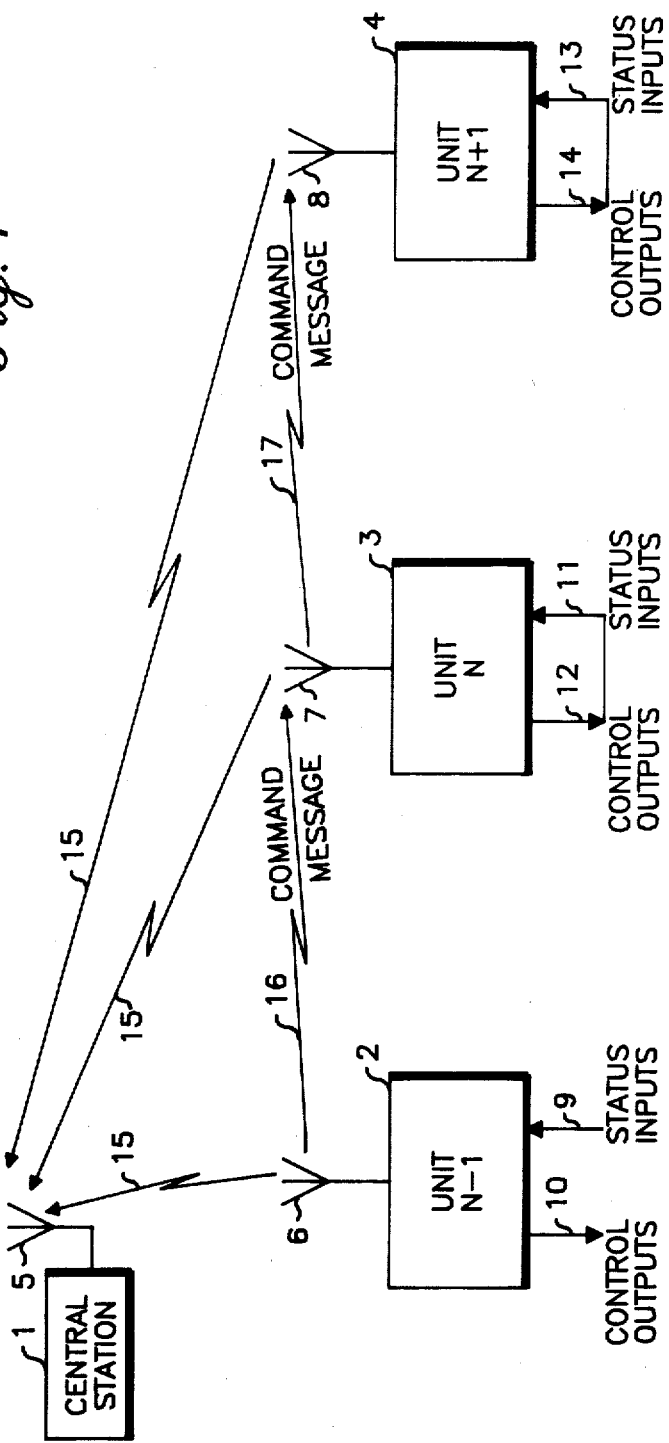
FIG. 1 is a schematic illustration of a supervisory control system which includes signal processing units in accordance with the present invention.

Referring to FIG. 1 the illustrated supervisory control system comprises a central station 1 which communicates with a system of remotely located signal processing units 2, 3 and 4. In the present system communication is via radio transmission from an aerial 5 of the central station 1 to serials 6, 7 and 8 of the remote units 2, 3 and 4 respectively.

In the illustrated system the processing unit 2 has an address N−1 the unit 3 has an address N and the unit 4 has an address N+1. The unit 2 has a number of status inputs only one such input 9 being illustrated and a number of control outputs of which only one such output 10 is illustrated. Similarly, the processing unit 3 has a status input 11 and a control output 12 whilst the unit 4 has a status input 13 and a control output 14.

The status inputs 9, 11 and 13 sense the status of digital signals fed thereto from monitoring equipment. For example, the units 2, 3 and 4 could be employed to monitor water levels and when the monitored water level reaches a predetermined level this will cause the closure of a sensing switch which will produce a change of status at one of the status inputs 9, 11 and 13.

The control output 10, 12 and 14 provide control functions. For example, a signal on one of the control outputs may be effective to close a relay contact to start a pump. The central station 1 supervises the activities of the processing units, 2, 3 and 4 and each of these units may receive a message from the central station for example instructing the unit to provide a message from the central station for example instructing the unit to provide a control output to start a pump. The receipt of a signal from the central station 1 by units 2, 3 or 4 is acknowledged by a transmission 15. Each status unit 2, 3 and 4 may also transmit a message to the central station 1 reporting on the state of its status inputs.

Each of the signal processing units 2, 3 and 4 has a unique address, the unit 2 being designated with the address N−1 unit 3 the address N, whilst the unit 4 is number N+1. Information transmitted from the central station to a signal processing unit and information transmitted from a unit is in the form of a digitally coded word which is transmitted as a frequency shift key (F.S.K.) signal. A suitable code word is illustrated in FIG. 2 to which reference will now be made.

Figure 2:
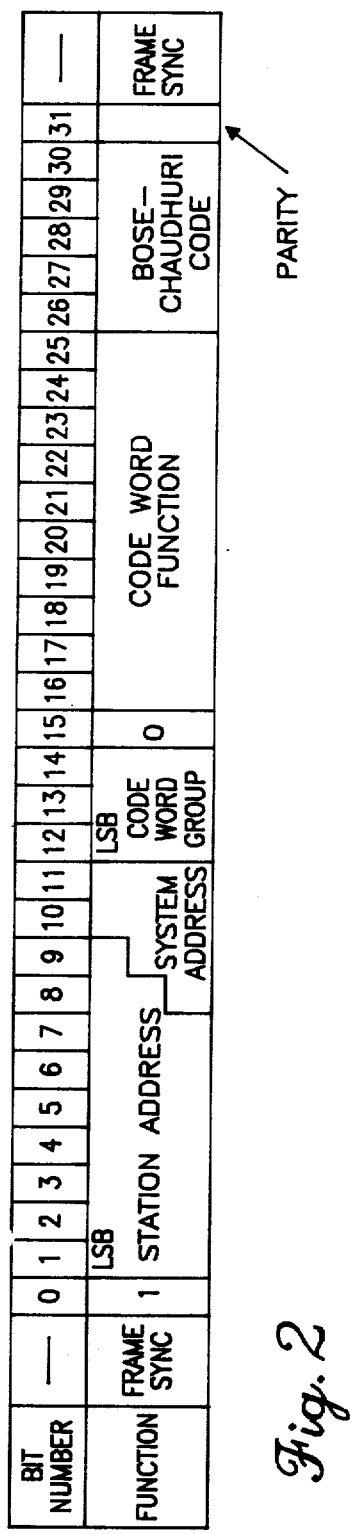
FIG. 2 illustrates a code word used for communication in the system of FIG. 1.

In FIG. 2 the illustrated code word contains 32 bits of information these bits being numbered from 0-31. Bit 0 in the present control system is always logical 1. Bits 1-11 define an address portion of the code word and identify a station for which a message is intended and a station from which a message originates. Bits 1-9 define the actual station address while bits 10 and 11 may be used to define a system address where more than one system of signal processing units is controlled by a single central station. Bits 12-25 effectively define the information content in the message, bits 12-14 signifying one group of a number of code word groups whilst bits 16-25 further define the function of the actual code word within the selection group. Bit 15 is always zero. Bits 26-30 constitute a Bose-Chaudhuri Cyclic code which is a function of all the preceeding bits and the final bit number 31 is a parity check bit for the entire code word.

Referring now back to FIG. 1 and in accordance with the present invention, each of the units 2, 3 and 4 responds to a predetermined stimulus to generate a message based upon its own address modified in a predetermined manner. In the present illustration assume that the predetermined stimulus is a change of status sensed by the status input 9 of the signal processing unit 2. Under these circumstances the unit 2 generates a message in the form of a code word using the code word format illustrated in FIG. 2 in which the station address consists of its own address which is incremented to the address of the next adjacent signal processing unit 3. A command message is then transmitted and is subsequently received by the signal processing unit.

After decoding the message this unit recognises its own address and acts on the instruction in the message. This instruction could be to activate its control output 12. This control output 12 is connected to the status input 11 of same unit and activation of this control output causes a change of status at the status input 11. This change of status at the input 11 acts as the predetermined stimulus for the signal processing unit 3 which in similar manner to the unit 2 transmits a command message 17 in which the destination address is derived from that of the unit 3 but incremented so as to co-incide with the address of the unit 4. This process may continue down a chain of signal processing units.

The status input 9 of the processing unit 2 may itself have sensed a change of status as a result of a message from the central station 1 or another remote unit. This message results in action at further units 3 and 4 each of which may be outside the range of communication with the central station 1.

Alternatively, the unit 2 can be arranged so that the message it transmits is addressed to the unit 3 whilst unit 3 generates its new message with the address of the unit 2. Each message transmitted by the unit 2 or 3 to the other unit may contain a command to be executed by the destination unit and also a report for the central station. The signal processing unit which receives a message from another unit may send out an acknowledgement to terminate transmission from the sender and this acknowledgement is also sensed by the central station 1.

Figure 3:
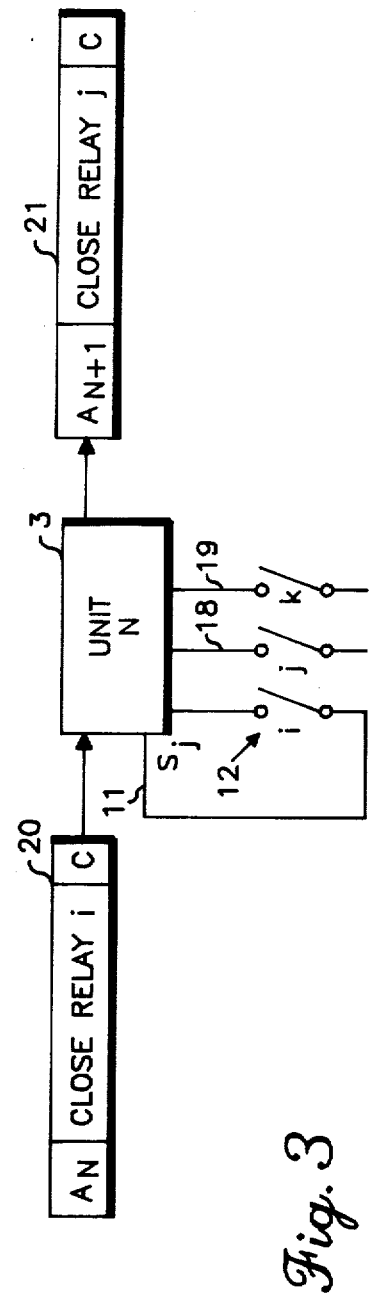
FIG. 3 is a highly schematic illustration of the operation of one embodiment of signal processing unit in accordance with the present invention.

A typical sequence of operation for the signal processing unit 3 will now be described in more detail with reference to FIG. 3 of the drawings where like parts to those in FIG. 1 bear like reference numerals. In FIG. 3 the signal processing unit 3 has a number of control outputs of which 3 referenced 12, 18 and 19 are illustrated. The control output 12 operates a relay i whilst the control outputs 18 and 19 operate relays j and k respectively. The unit 3 has a number of status inputs which only one referenced 11 is shown and this status input is connected to the relay i. The status input 11 of the unit 3 is also referenced sj indicating that this status input is related to the functions of a further relay j in a neighbouring signal processing unit.

Assume now that the unit 3 receives a message 20 which contains its own address $A_N$, a control portion C and a command to close the relay i. After the decoding of the message 20, the unit 3 will provide an output signal at its control output 12 to close the relay i. This control output being wired to the status input 11 will provide the required stimulus for the unit 3 to generate and transmit a new message 21 which contains an address $A_{N+}$ which is derived from its own address by incrementation to that of the adjacent signal processing unit. This message contains a command to close the relay j in that signal processing unit. Consequently a message received by the signal processing unit 3 causing it to activate one control relay results in the activation of another relay in a different signal processing unit.

Figure 4:
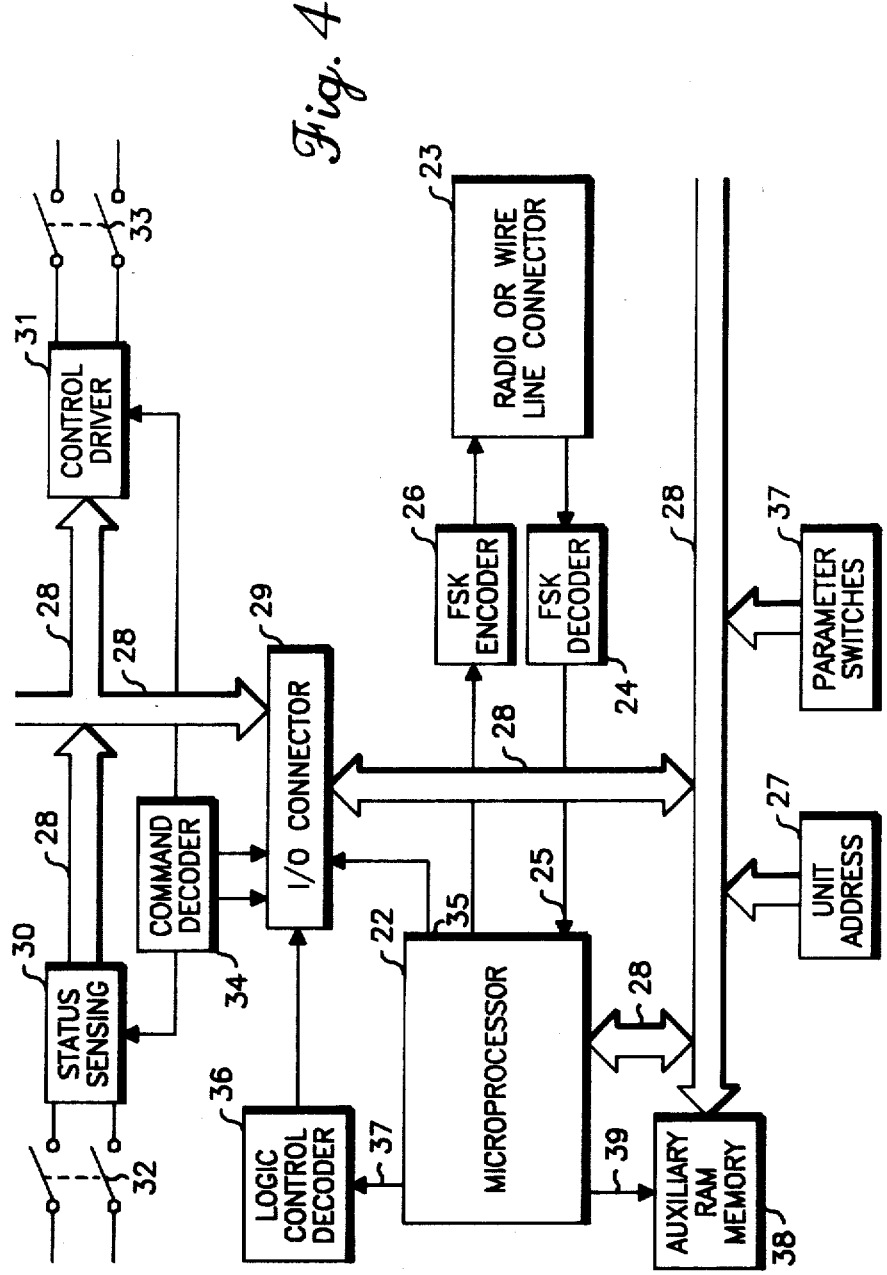
FIG. 4 illustrates a signal processing unit in accordance with the invention in more detail and FIG. 5 is an explanatory flow chart for the signal processing unit of FIG. 4.

Referring now to FIG. 4 there is shown a more detailed schematic illustration of a signal processing unit in accordance with the invention. The unit includes a microprocessor 22, typically a Mostek 3870. The processing unit has a transeiver (not shown) which may be a radio or wire line unit and signals to and from this transeiver are coupled by means of a connector 23. Receive signals are decoded by a FSK decoder 24 and fed to an input 25 of the microproccesor 22. Similarly signals intended for transmission from the unit are fed from the microprocessor 22 to the connector 23 by an FSK encoder 26. The address of the unit is set in an address store unit 27 which the store 27 and the microprocessor 22 from a data bus 28 to which the store 27 and the microprocessor 22 are coupled. The data bus 28 is also coupled via an input/output connector 29 to a status sensing unit 30 and a control output driver 31. The status sensing unit 30 formed by a number of gates senses the state of a number of status inputs 32 whilst the control driver 31 provides control outputs to activate relays 33.

Status information sensed by the status sensing unit 30 is put onto the data bus 28 under the control of a command decoder 34 typically formed by a Motorola MC 14556, which decodes commands fed from an output 35 of the microprocessor 22 via the input/output connector 29 and these commands are decoded under the control of a logic control decoder 36 which also receives signals from an output 37 of the microprocessor and which is also connected to the command decoder 34 via the input/output connector 29. The command decoder 34 is also coupled to the control driver 31 and therefore ensures that either status information or control signals for the control relays 33 is fed to the data bus 28.

Also coupled to the data bus 28 is a digital parameter store in the form of a number of DIP switches 37 and these switches are used to define a number of parameters which determined how the signal processing unit operates. The parameters are transferred via the data bus 28 under the control of the microprocessor 22 into an auxilliary RAM memory 38 which is accessed by the microprocessor via a connecting line 39.

The parameters can determine various operating modes. For example one parameter may determine whether the relays 33 are latching or momentary in operation. One parameter may determine whether the microprocessor generates a new message in response to the predetermined stimulus and another parameter may determine whether the new address for transmission is obtained by augmenting or decrementing the address of the unit concerned. Another parameter may determine the length of a transmission burst from the signal processing unit. The above are only a few typical examples of the controls which may be exercised by setting the parameters switches 37.

Assume that a coded message is sent to the illustrated signal processing unit to activate one of the relays 33. After decoding in the F.S.K. decoder 24 the message appears as a series of marks and spaces at the input 25 of the microprocessor 22. The microprocessor 22 reads the unit address from the address store 27 via the data bus 28 and if this address matches the address in the decoded message the microprocessor will act on the data contained in the message. A command will be transferred to the command decoder 34 from the output 35 of the microprocessor via input/output connector 29, and this command will be decoded by the command decoder 34 under the control of the logical control decoder 36 and will result in the connection of the control driver 31 to the data bus 28 and the subsequent operation of one of the relays 33.

Assume now that in this unit the activated relay is connected to one of the status inputs 32. This will produce a change of state at that status input and under command from the command decoder 34 the status sensing unit 30 will feed status information onto the data bus 28 and this will record the change of status at the status input which is coupled to the activated relay of the relays 33. This change of status will be fed via the data bus 28 to the microprocessor and in accordance with the setting of the parameters by the parameter switches 37 the microprocessor will generate a new message having an address derived from its own address by incrementing or decrementing that address in accordance with the settings of the parameter switches 37. The message with the new address portion will be encoded by the F.S.K encoder 26 and fed to the connector 23 for subsequent transmission to the signal processing unit having the new destination address.

Figure 5:
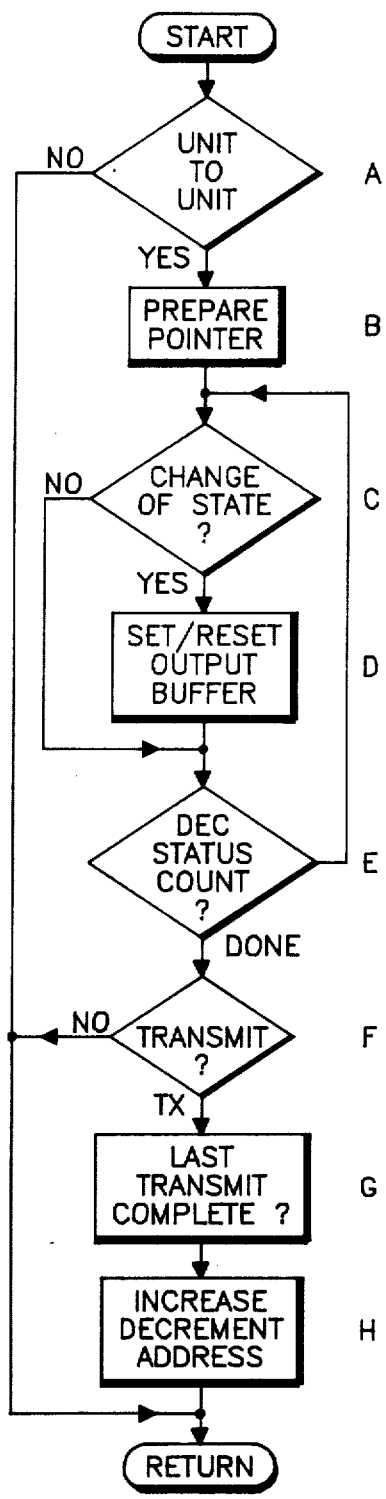

Referring now to FIG. 5 in conjunction with FIG. 4 there is shown a flow chart which outlines the programming of the microprocessor 22 to achieve the transmission of a message from one unit to another. The steps of the programme are indicated by letters A to H.

At step A programme determines if the generation of a new message i.e. communication from one signal processing unit to another is enabled, the enabling being as described by means of the parameter switches 37.

At stage B a pointer is prepared to a look up table in the memory of the microprocessor 22 to determine which of the status inputs when changed in state cause generation of a message to a unit having the incremented or decremented address. There may be more than one status input effective to cause the generation of a message having an incremented or decremented address and a change of state at each of the appropriate status input may result in a message to an adjacent unit to operate a respective control relay.

The memory of the microprocessor includes a status counter which forms a pointer to status information from each status input 32 in turn. Decrementation of the status counter results in examination in turn of the state of each status input 32 as fed over the bus 28. At stage B of the programme the status counter is initialised.

At stage C the programme asks has the status input pointed to by the status counter changed in state? If the answer is no, the programme moves to stage E. If yes, programme moves to stage D.

At stage D "set" or "reset" control bits are added to output buffer in microprcessor memory which buffer stores message for transmission by the unit. The "set" and "reset" control bits are added in accordance with the status counter and the look up table.

At stage E programme decrements status counter and checks if done.

Stage F asks if transmission by the unit is necessary i.e. has there been at least one change of state? If no transmission called for the programme returns to stage A. If the answer is yes, programme advances to stage G.

At stage G, check if a previous transmission sequence is complete. If not add the output buffer contents to previous contents (i.e. to previous transmission contents) and restart transmission sequence.

Stage H change address of transmitted word plus or minus one from that of this unit in accordance with the associated parameter.

The invention has been described by way of example and modifications may be made without departing from the scope of the invention. For example, as described the predetermined stimulus which causes the generation of a new message address is a change of state at one of the status inputs which change may be generated by a hard wired connection from a control output in the same unit. This however, is not essential. The hard wired connection may be replaced by the linking of the status and control input within the programme of the microprocessor 22. Also the predetermined stimulus need not necessarily be linked to the operation of status inputs or control outputs. The required stimulus may be derived directly from a message transmitted from the central station or from another signal processing unit. This mode of operation being accomplished entirely by the programming of the microprocessor 22.

We claim:

1. A signal processing unit for use in a supervisory control system having at least one central station for communicating with a plurality of said units each identified by an unit address, said signal processing unit comprising:

means for receiving messages including at least an address signal and an from said central station and/or said preceding unit;

processing means for processing said information signal including means for modifying said address signal to provide a destination signal and preambling said destination signal to said processed information signal; and means for transmitting said processed information signal preambled by said destination signal to said central station and/or said succeeding unit.

2. A signal processing unit as claimed in claim 9 wherein the unit includes one or more control outputs each operable under the control of a processing means to provide a control signal output and the said change of state at one or more of the status inputs is derived by coupling the said one or more status inputs to respective ones of the control outputs.

3. A signal processing unit as claimed in claim 2 wherein the coupling between status inputs and control outputs is a hard wired coupling.

4. A signal processing unit as claimed in claim 2 wherein the coupling is provided by the processing means under programme control.

5. A signal processing unit as claimed in claim 1 wherein the processing means is a microprocessor.

6. A signal processing unit as claimed in claim 1, which includes a digital storage means for storing the unit address.

7. A signal processing unit as claimed in claim 1, wherein the processing means is operative to increment or decrement the unit address by a predetermined amount to provide said destination signal.

8. A signal processing unit for use in a supervisory control system having at least one central station for communicating with a plurality of said units each identified by an unit address, said signal processing unit comprising:
- means for receiving messages including at least an address signal and an information signal from said central station and/or said preceding unit
- means for responsive to a predetermined stimulus for modifying the unit address to provide a destination signal, including means for preambling said destination signal to said information signal; and
- means for transmitting said information signal preambled by said destination signal to said central station and/or said succeeding unit.

9. A signal processing unit as claimed in claim 8 wherein the signal processing unit includes one or more status monitoring inputs, the predetermined stimulus comprising a change of state detected at one or more of the status inputs.

10. A method of communicating messages between at least one central station and a plurality of signal processing units each having a predetermined unit address, comprising the steps of:
at the central station;
  (a) transmitting a message comprised of at least an information signal preambled by an address signal to the plurality of signal processing units;
at the signal processing units;
  (a) receiving said message from said central station;
  (b) processing said information signal if said address signal matches the predetermined unit address of the signal processing unit;
  (c) modifying said address signal to provide a destination signal;
  (d) transmitting a message comprised of at least said processed information signal preambled by said destination signal to the remaining plurality of signal processing units.

11. A method of communicating messages between at least two of a plurality of signal processing units each having a predetermined unit address, comprising the steps of:
at a first signal processing unit;
  (a) detecting a change of state in at least one of a plurality of status monitoring inputs;
  (b) generating an address signal;
  (c) generating an information signal;
  (d) transmitting a message comprised of at least said information signal preambled by said address signal to the plurality of signal processing units;
at the plurality of signal processing units;
  (a) receiving said message from said first signal processing unit;
  (b) processing said information signal if said address signal matches the predetermined unit address of the signal processing unit;
  (c) modifying said address signal to provide a destination signal;
  (d) transmitting a message comprised of at least said processed information signal preambled by said destination signal to the remaining plurality of signal processing units.

* * * * *